(12) United States Patent
Chung

(10) Patent No.: US 10,621,208 B2
(45) Date of Patent: Apr. 14, 2020

(54) CATEGORY NAME EXTRACTION DEVICE, CATEGORY NAME EXTRACTION METHOD, AND CATEGORY NAME EXTRACTION PROGRAM

(71) Applicant: Rakuten, Inc., Shinagawa-ku, Tokyo (JP)

(72) Inventor: YoungJoo Chung, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 472 days.

(21) Appl. No.: 14/758,318

(22) PCT Filed: Dec. 27, 2013

(86) PCT No.: PCT/JP2013/085166
§ 371 (c)(1),
(2) Date: Jun. 29, 2015

(87) PCT Pub. No.: WO2015/097881
PCT Pub. Date: Jul. 2, 2015

(65) Prior Publication Data
US 2015/0347564 A1 Dec. 3, 2015

(51) Int. Cl.
*G06F 16/28* (2019.01)
*G06Q 30/06* (2012.01)
(Continued)

(52) U.S. Cl.
CPC .......... *G06F 16/285* (2019.01); *G06F 16/951* (2019.01); *G06Q 10/10* (2013.01); *G06Q 30/02* (2013.01); *G06Q 30/0625* (2013.01)

(58) Field of Classification Search
CPC ........ G06F 17/30598; G06F 17/30864; G06Q 30/02; G06Q 10/10; G06Q 30/625
See application file for complete search history.

(56) References Cited

U.S. PATENT DOCUMENTS 8,489,523 B2 * 7/2013 Wang ................ G06F 17/30705
706/12
9,201,967 B1 * 12/2015 Zhao ...................... G06Q 30/06
(Continued)

FOREIGN PATENT DOCUMENTS

JP 2007-505422 A 3/2007

OTHER PUBLICATIONS

International Search Report for PCT/JP2013/085166 dated Feb. 10, 2014.

*Primary Examiner* — Kris E Mackes
*Assistant Examiner* — Soheila (Gina) Davanlou
(74) *Attorney, Agent, or Firm* — Sughrue Mion, PLLC

(57) ABSTRACT

A category name extraction device includes a specifying means configured to specify a word contained in a plurality of item information respectively belonging to a plurality of categories in parallel structure, qualifying or being qualified by a name of a category where each item information belongs, and being in common to a plurality of item information belonging to a plurality of different categories, as a reference word, an extraction means configured to extract a word contained in a phrase contained in item information belonging to any of the plurality of categories, qualifying or being qualified by the reference word, and being different from names of the plurality of categories, as a candidate category name, and an output means configured to output the candidate category name extracted by the extraction means.

14 Claims, 11 Drawing Sheets

(51) Int. Cl.
  *G06F 16/951*  (2019.01)
  *G06Q 10/10*  (2012.01)
  *G06Q 30/02*  (2012.01)

(56) References Cited

U.S. PATENT DOCUMENTS

| | | | |
|---|---|---|---|
| 9,251,244 B1* | 2/2016 | Rajaraman | G06F 16/285 |
| 2004/0254950 A1 | 12/2004 | Musgrove et al. | |
| 2005/0138079 A1* | 6/2005 | Liu | G06F 17/30707 |
| 2006/0282339 A1 | 12/2006 | Musgrove et al. | |
| 2009/0106108 A1* | 4/2009 | Ku | G06Q 30/0256 |
| | | | 705/14.54 |
| 2010/0262599 A1* | 10/2010 | Nitz | G06F 16/285 |
| | | | 707/723 |
| 2011/0137908 A1* | 6/2011 | Dom | G06F 17/30707 |
| | | | 707/740 |
| 2011/0295895 A1 | 12/2011 | Musgrove et al. | |
| 2012/0215783 A1 | 8/2012 | Musgrove et al. | |
| 2012/0259882 A1* | 10/2012 | Thakur | G06Q 30/0625 |
| | | | 707/767 |
| 2013/0262979 A1* | 10/2013 | Gu | G06F 17/30873 |
| | | | 715/234 |

* cited by examiner

Fig.4
(a)
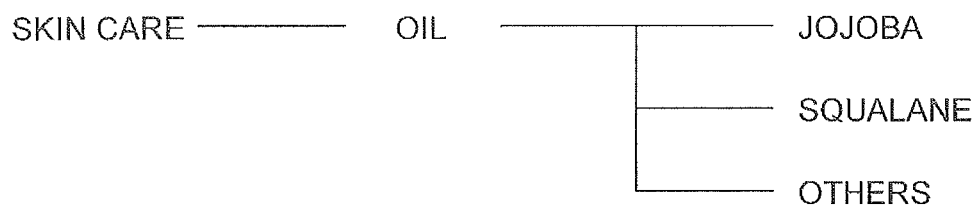
(b)
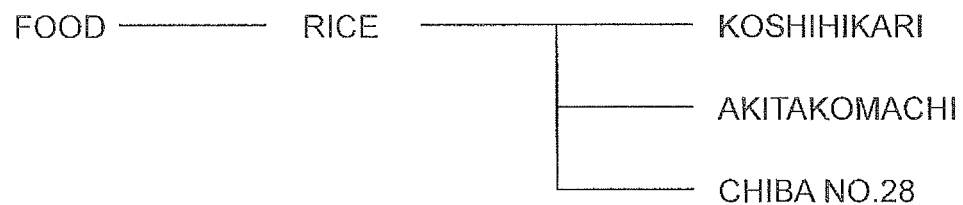

Fig.5
(a)
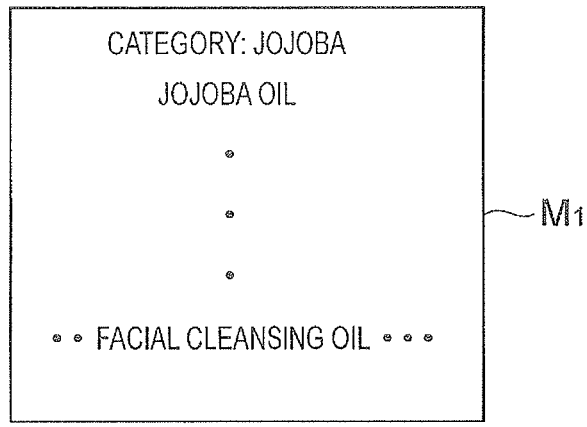
(b)
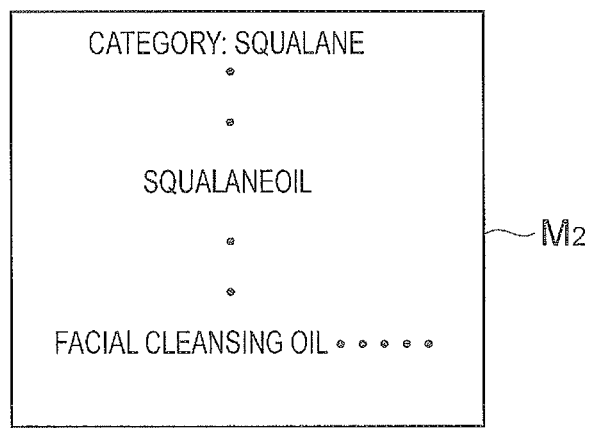
(c)
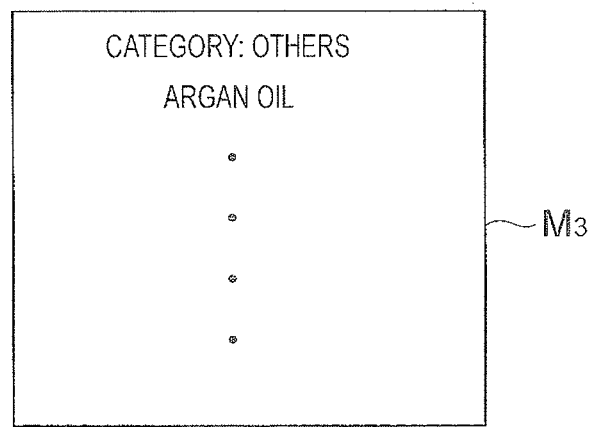

*Fig.7*
(a)
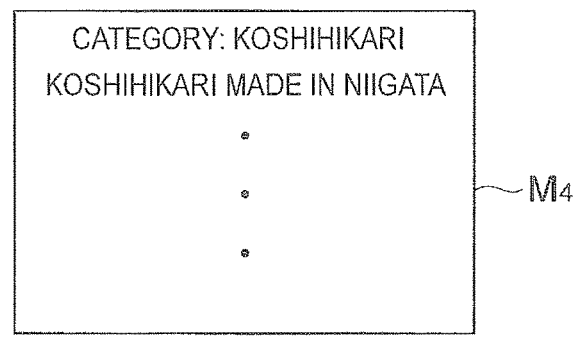
(b)
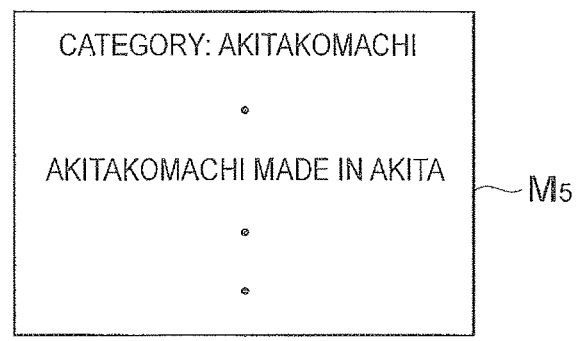
(c)
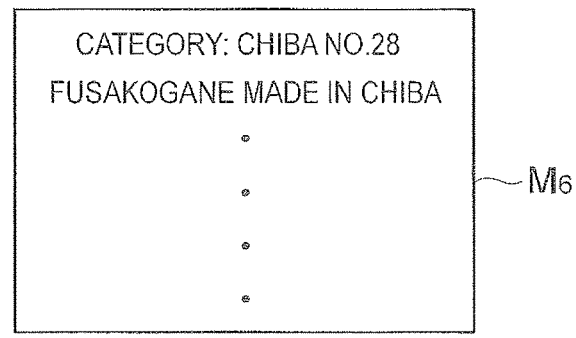
(d)
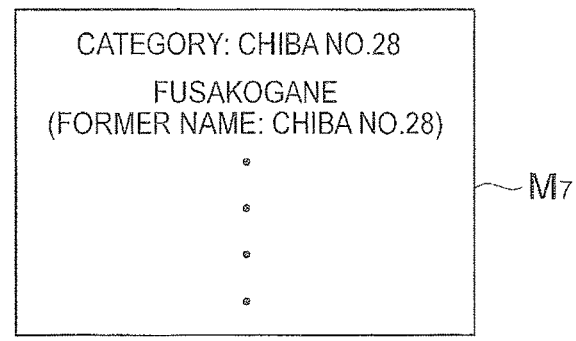

Fig.9

Check the box next to the product
to be re-registered in the new sub-category "Argan"

| ☐ | Oil A 100ml |
| ☐ | Additive-free Oil B 30ml |
| ☐ | Moisturizing Oil C 140ml |
| ☐ | ..... |

Modify Registration

CATEGORY NAME EXTRACTION DEVICE, CATEGORY NAME EXTRACTION METHOD, AND CATEGORY NAME EXTRACTION PROGRAM

CROSS REFERENCE TO RELATED APPLICATIONS

This application is a National Stage of International Application No. PCT/JP2013/085166 filed Dec. 27, 2013, the contents of which are incorporated herein by reference in their entirety.

TECHNICAL FIELD

One aspect of the present invention relates to a category name extraction device, a category name extraction method, and a category name extraction program.

BACKGROUND ART

In an electronic commerce site that sells products and services, products and the like are often classified into categories for the convenience of product purchasers and sellers. For example, a technique that classifies goods into goods categories in a plurality of hierarchical levels is known (for example, Patent Literature 1).

CITATION LIST

Patent Literature

PTL 1: Japanese Unexamined Patent Application Publication No. 2007-505422

SUMMARY OF INVENTION

Technical Problem

Maintenance of a category name on an electronic commerce site is required in the cases when there is a new product that should not be classified into the existing category, when another name becomes more common as a category name than the name currently set as the category name and the like. The maintenance has been done manually, which takes time and effort. Note that the need for the maintenance of a category name arises not only for an electronic commerce site. For example, maintenance is required later for a category name classified manually, such as classification of services and a category search site.

In view of the above, an object of one aspect of the present invention is to reduce the time and effort required for maintenance of a category name for classifying item information related to items such as products.

Solution to Problem

In order to solve the above problem, a category name extraction device according to one aspect of the present invention includes a specifying means configured to specify a word contained in a plurality of item information respectively belonging to a plurality of categories in parallel structure, qualifying or being qualified by a name of a category where each item information belongs, and being in common to a plurality of item information belonging to a plurality of different categories, as a reference word, an extraction means configured to extract a word contained in a phrase contained in item information belonging to any of the plurality of categories, qualifying or being qualified by the reference word, and being different from names of the plurality of categories, as a candidate category name, and an output means configured to output the candidate category name extracted by the extraction means.

A category name extraction method according to one aspect of the present invention is a category name extraction method in a category name extraction device, the method including a specifying step of specifying a word contained in a plurality of item information respectively belonging to a plurality of categories in parallel structure, qualifying or being qualified by a name of a category where each item information belongs, and being in common to a plurality of item information belonging to a plurality of different categories, as a reference word, an extraction step of extracting a word contained in a phrase contained in item information belonging to any of the plurality of categories, qualifying or being qualified by the reference word, and being different from names of the plurality of categories, as a candidate category name, and an output step of outputting the candidate category name extracted in the extraction step.

A category name extraction program according to one aspect of the present invention causes a computer to implement a specifying function to specify a word contained in a plurality of item information respectively belonging to a plurality of categories in parallel structure, qualifying or being qualified by a name of a category where each item information belongs, and being in common to a plurality of item information belonging to a plurality of different categories, as a reference word, an extraction function to extract a word contained in a phrase contained in item information belonging to any of the plurality of categories, qualifying or being qualified by the reference word, and being different from names of the plurality of categories, as a candidate category name, and an output function to output the candidate category name extracted by the extraction function.

According to the above aspects, a word contained in item information belonging to a plurality of categories, qualifying or being qualified by a name of a category where the item information belongs, and contained in common in item information of a plurality of different categories is specified as a reference word. Then, a word contained in item information belonging to a plurality of categories, qualifying or being qualified by the reference word, is extracted and output as a candidate category name. The word that represents the features of the items which belong to the same level as the plurality of categories and that is appropriate for classifying the items is thereby output, and it is thus possible to reduce the time and effort required for maintenance such as category name setting.

In a category name extraction device according to another aspect, the extraction means may exclude a word contained in item information belonging to the plurality of categories, qualifying or being qualified by the reference word, and contained in a plurality of item information belonging to the plurality of categories at a specified frequency or more from the candidate category name.

According to the above aspect, the word contained in a plurality of item information belonging to the plurality of categories at a specified frequency or more, even if it is contained in item information belonging to the plurality of categories, qualifying or being qualified by the reference word, is likely to be the word representing the features in common to all of the plurality of categories, not the features unique to the item, and therefore not appropriate as a category name. According to the above aspect, it is possible to prevent such a word that is not appropriate as a category name from being output as the candidate category name.

A category name extraction device according to another aspect may further include a setting means configured to set the candidate category name as a category in parallel structure with the plurality of categories.

According to the above aspect, because the word output as the candidate category name is set as a category, it is possible to reduce the time and effort required for category setting.

In a category name extraction device according to another aspect, when a magnitude relationship between the number of searches for each category name of the plurality of categories and the number of searches for a word being the candidate category name in the item information belonging to the plurality of categories satisfies a specified condition, the setting means may set the candidate category name as a category in parallel structure with the plurality of categories.

According to the above aspect, in the case where the number of items that are to belong to a category when a word being the candidate category name is set as the category satisfies a specified condition, the candidate category name is set as the category, and it is thereby possible to set a category with an appropriate word as a new category name.

In a category name extraction device according to another aspect, when a set of search results with a word being the candidate category name contains a set of search results with a word being a category name of one category among the plurality of categories to a certain degree or higher in the item information belonging to the plurality of categories, the setting means may set the candidate category name as a category in place of the one category.

When a set of search results with a word being the candidate category name contains a set of search results with a word being the existing category name to a certain degree or higher, it is highly likely that the word being the candidate category name has become more common as a word representing the category than the existing category name. According to the above aspect, because the word that is more common as a word representing the category is set as a category, the category structure suitable for product search is implemented.

In a category name extraction device according to another aspect, when the item information belonging to the plurality of categories contain a specified description indicating a relationship between a category name of one category among the plurality of categories and the candidate category name, the setting means may set the candidate category name as a category in place of the one category.

According to the above aspect, when a description indicating a relationship between the existing category name and the candidate category name is contained in item information, the candidate category name is set as a category. A word that is appropriate as a category name is thereby set as a new category, in place of the existing category.

In a category name extraction device according to another aspect, the plurality of categories may be categories for classifying at least one of products and services offered by stores on an electronic commerce site, the item information may be product information being information about a product or a service, and when a magnitude relationship between the number of times a product or a service is purchased based on search with a word being the candidate category name and the number of times a product or a service is purchased based on search with each category name of the plurality of categories in the product information belonging to the plurality of categories satisfies a specified condition, the setting means may set the candidate category name as a category in parallel structure with the plurality of categories.

The fact that the number of times a product is purchased based on search with a word being the candidate category name means that the frequency that a product is searched based on that word is high. According to the above aspect, because such a word is set as a category, the category structure suitable for product search is implemented.

In a category name extraction device according to another aspect, the plurality of categories may be categories for classifying at least one of products and services offered by stores on an electronic commerce site, the item information may be product information being information about a product or a service, and when a set of stores selling products or services belonging to the plurality of categories and a set of stores selling products or services containing a word being the candidate category name in the product information coincide to a certain degree or higher, the setting means may set the candidate category name as a category.

According to the above aspect, because the candidate category name to which products on sale by stores that are similar to the stores selling products belonging to the existing category are classified is set as a category, it is possible to set an appropriate candidate category name as a category to be in parallel structure with the existing category or a category to replace the existing category.

In a category name extraction device according to another aspect, the plurality of categories may be categories for classifying at least one of products and services offered by stores on an electronic commerce site, the item information may be product information being information about a product or a service, and when a set of products or services on sale by stores selling products or services belonging to the plurality of categories and a set of products or services on sale by stores selling products or services containing a word being the candidate category name in the product information coincide to a certain degree or higher, the setting means may set the candidate category name as a category.

According to the above aspect, because the candidate category name to which products on sale by stores that sell products similar to products on sale by the stores selling products belonging to the existing category are classified is set as a category, it is possible to set an appropriate candidate category name as a category to be in parallel structure with the existing category or a category to replace the existing category.

In a category name extraction device according to another aspect, the plurality of categories may be categories for classifying at least one of products and services offered by stores on an electronic commerce site, the item information may be product information being information about a product or a service, and when a price range of products or services belonging to the plurality of categories and a price range of products or services containing a word being the candidate category name in the product information coincide to a certain degree or higher, the setting means may set the candidate category name as a category.

According to the above aspect, because the candidate category name to which products in a price range similar to a price range of products belonging to the existing category are classified is set as a category, it is possible to set an appropriate candidate category name as a category to be in parallel structure with the existing category or a category to replace the existing category.

In a category name extraction device according to another aspect, the plurality of categories may be categories for classifying at least one of products and services offered by stores on an electronic commerce site, the item information may be product information being information about a product or a service, and when distribution of prices of products or services containing a word being the candidate category name in the product information is equal to or less than a specified value, the setting means may set the candidate category name as a category.

According to the above aspect, because the candidate category name to which like products are classified when set as a category is set as a category, it is possible to set an appropriate candidate category name as a category to be in parallel structure with the existing category or a category to replace the existing category.

In a category name extraction device according to another aspect, the plurality of categories may be categories for classifying at least one of products and services offered by stores on an electronic commerce site, the item information may be product information being information about a product or a service, and the category name extraction device may further include a registration means configured to, when the candidate category name is to be set as a new category by the setting means, transmit inquiry information to a terminal of a store selling products or services containing a word being the candidate category name in the product information to prompt a change of a category where the products or services belong to the category to be newly set, and change the category of the products or services according to a response from the terminal of the store to the transmission of the inquiry information.

According to the above aspect, it is possible to appropriately classify products on sale by each store again into the category newly set.

Advantageous Effects of Invention

According to one aspect of the present invention, it is possible to reduce the time and effort required for maintenance of a category name for classifying item information related to items such as products.

BRIEF DESCRIPTION OF DRAWINGS

FIG. 4 is a view schematically showing an example of category information stored in a product category information storage unit 22.

FIG. 5 is a view schematically showing an example of product information.

FIG. 7 is a view schematically showing an example of product information.

FIG. 9 is a view showing an example of a display screen of inquiry information.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
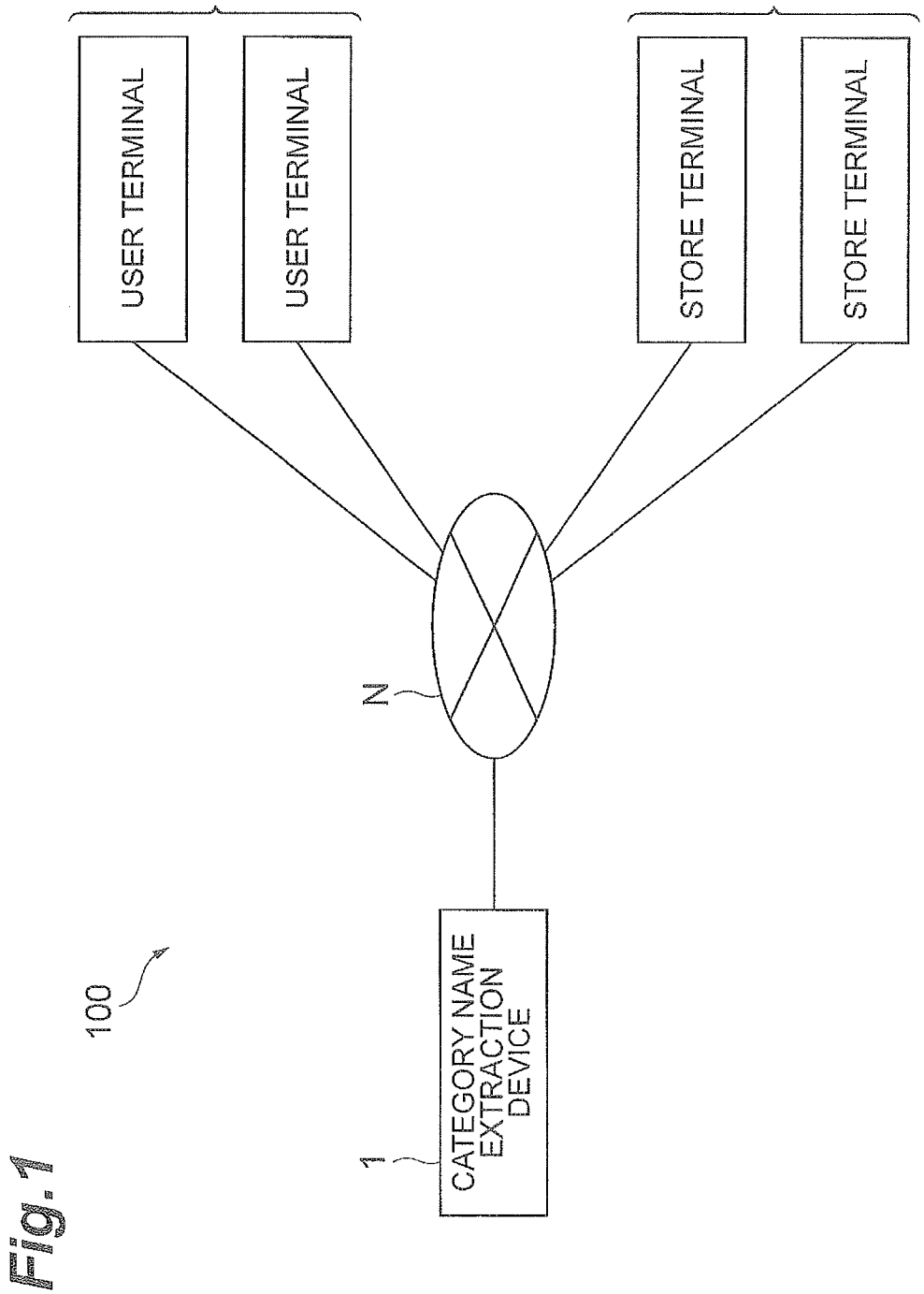
FIG. 1 is a view showing a configuration of a system including a category name extraction device.

FIG. 1 is a view showing a configuration of a category name extraction system 100 including a category name extraction device 1 according to this embodiment. As shown in FIG. 1, the category name extraction system 100 includes the category name extraction device 1, user terminals T, and store terminals D. The category name extraction device 1, the store terminals D and the user terminals T are connected with one another through a network N such as the Internet. The store terminal D is a terminal that is located in a store which sells products on an electronic commerce site. The user terminal T is a terminal that is used by a user who purchases a product on an electronic commerce site. Devices for the store terminals D and the user terminals T are not limited, and they may be stationary or portable personal computers, or mobile terminals such as advanced mobile phones (smart phones), cellular phones or personal digital assistants (PDA), for example.

Figure 2:
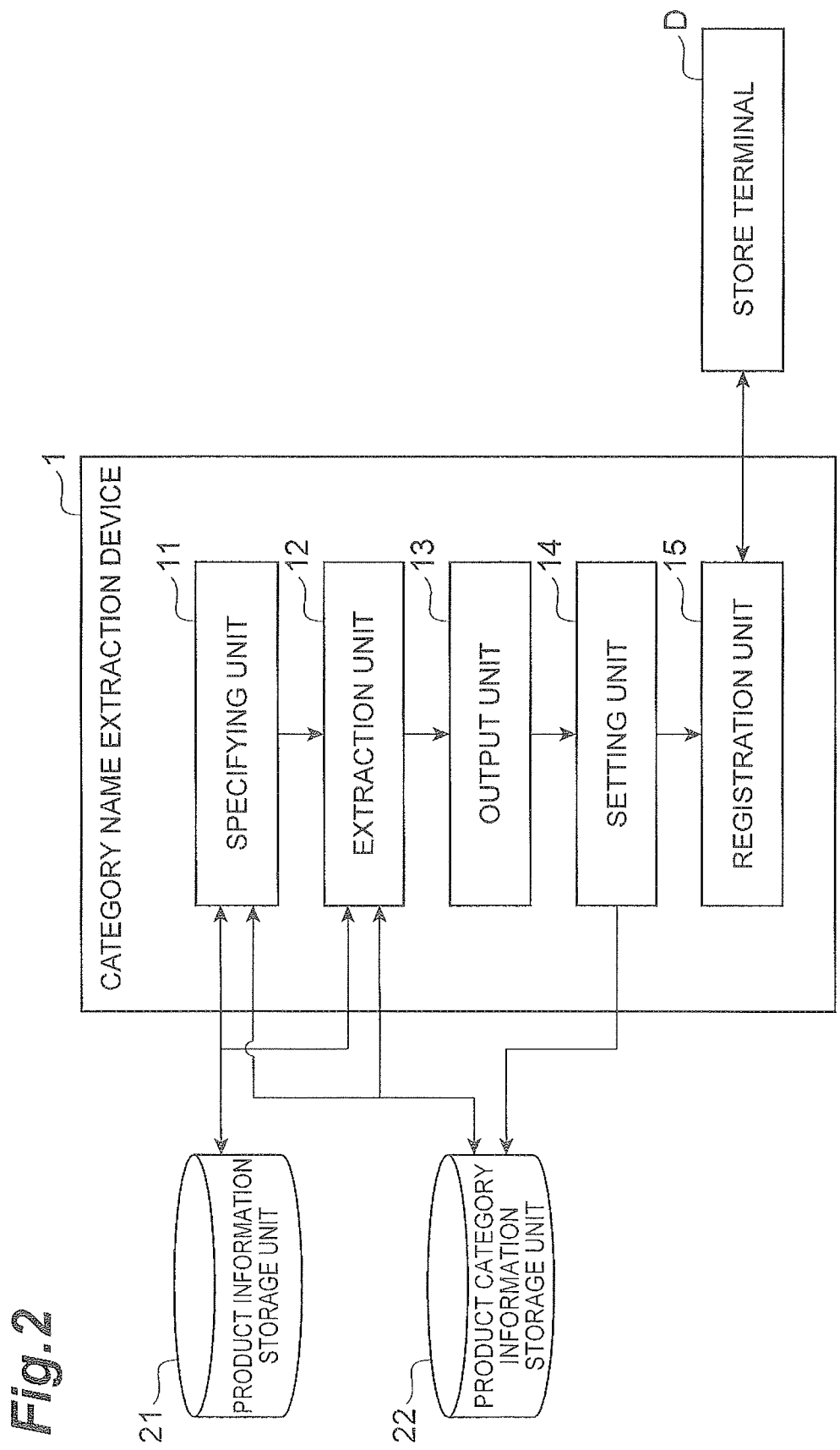
FIG. 2 is a block diagram showing a functional configuration of the category name extraction device.

FIG. 2 is a block diagram showing a functional configuration of the category name extraction device 1 according to this embodiment. The category name extraction device 1 is a device that automatically extracts and outputs a word being a candidate for a category name to classify products on an electronic commerce site. As shown in FIG. 2, the category name extraction device 1 according to this embodiment functionally includes a specifying unit 11 (specifying means), an extraction unit 12 (extraction means), an output unit 13 (output means), a setting unit 14 (setting means), and a registration unit 15 (registration means). Further, each of the functional units of the category name extraction device 1 can access a product information storage unit 21 and a product category information storage unit 22. Note that, although the case of extracting a word being the candidate category name of a category for classifying products, services and the like offered by stores on an electronic commerce site is described as an example in this embodiment, the extraction of a word being the candidate category name is not limited thereto. For example, the category name extraction device 1 according to this embodiment is applicable to any case where a category name has been set manually, such as the extraction of to a candidate for a category name on a category search site or the like.

Figure 3:
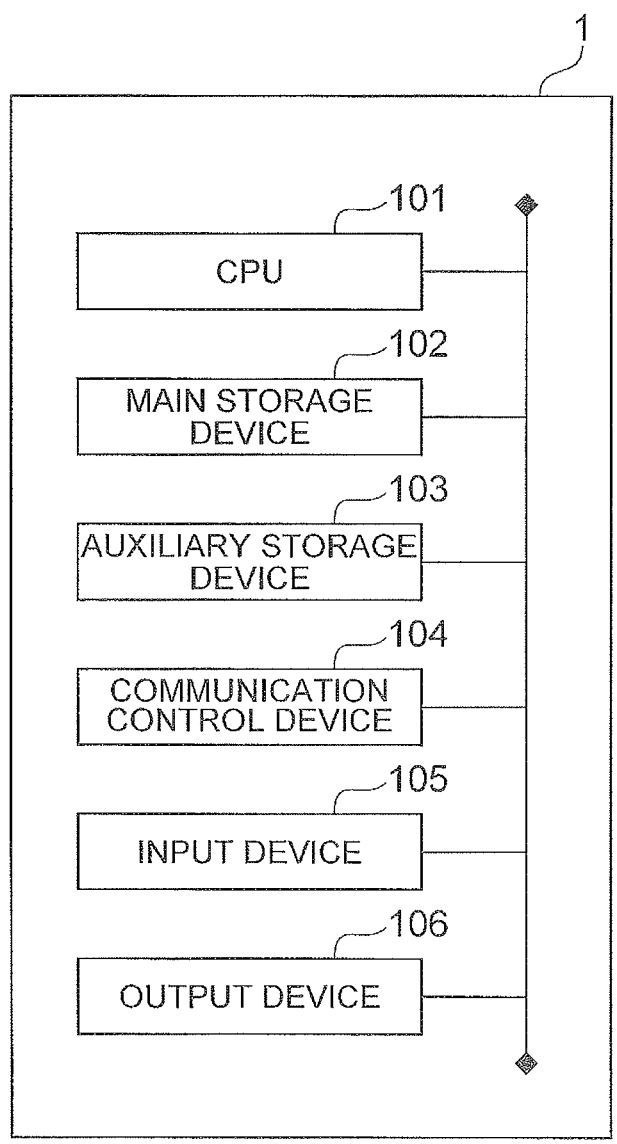
FIG. 3 is a view showing a hardware configuration of the category name extraction device.

FIG. 3 is a hardware configuration diagram of the category name extraction device 1. As shown in FIG. 3, the category name extraction device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (category name extraction program) onto hardware such as the CPU 101 or the main storage device 102 shown in FIG. 3, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the category name extraction device 1, the product information storage unit 21 and the product category information storage unit 22 are described hereinbelow. The product information storage unit 21 is a storage means that stores product information (item information) of products (items) on sale on an electronic commerce site to which the category name extraction device 1 belongs. The product information at least contains a word related to the product. Specifically, the product information contains a description of the product, a word indicating the attribute of the product and the like. Further, the product information contains information of a category to which the product belongs as the attribute.

The product category information storage unit 22 is a storage means that stores category information related to categories for classifying products offered by stores on an electronic commerce site. FIG. 4 is a view schematically showing an example of the category information stored in the product category information storage unit 22. As shown in FIG. 4, the category information has a tree structure (or a hierarchical structure), for example. In the example shown in FIG. 4(a), the category "Oil" is set at the level under the category "Skin care". Further, the categories such as "Jojoba", "Squalane" and "Others" are set at the level under the category "Oil". "Jojoba", "Squalane" and "Others" belong to the same level and are in parallel structure. In the example shown in FIG. 4(b), the category "Rice" is set at the level under the category "Food". Further, the categories such as "Koshihikari", "Akitakomachi" and "Chiba No. 28" are set at the level under the category "Rice". "Koshihikari", "Akitakomachi" and "Chiba No. 28" belong to the same level and are in parallel structure.

The functional units of the category name extraction device 1 are described hereinbelow. The specifying unit 11 is a part that specifies a reference word for extracting a candidate category name. To be specific, the specifying unit 11 specifies, as the reference word, a word that is contained in a plurality of product information (item information) which respectively belong to a plurality of categories in parallel structure, qualifying or being qualified by the name of the category to which each product information belongs, and that is contained in common in the plurality of product information which belong to different categories.

The processing of specifying the reference word is specifically described hereinafter with reference to FIG. 5. FIG. 5 is a view schematically showing an example of the product information. The product information $M_1$ shown in FIG. 5(a) belongs to the category "Jojoba" and contains the words such as "Jojoba oil" and "Facial cleansing oil". The product information $M_2$ shown in FIG. 5(b) belongs to the category "Squalane" and contains the words such as "Squalane oil" and "Facial cleansing oil". The product information $M_3$ shown in FIG. 5(c) belongs to the category "Others" and contains the word such as "Argan oil".

The specifying unit 11 acquires the phrase "Jojoba oil" that contains the category name "Jojoba" from the product information $M_1$ that belongs to the category "Jojoba", and acquires the phrase "Squalane oil" that contains the category name "Squalane" from the product information $M_2$ that belongs to the category "Squalane". In other words, the specifying unit 11 acquires "Jojoba oil" and "Squalane oil" as the phrases that are contained in a plurality of product information which respectively belong to a plurality of categories and that contain the category name to which the product information belongs. Note that, because the phrase that contains the category name "Others" is not contained in the product information $M_3$, the specifying unit 11 does not acquire the phrase for specifying the reference word from the product information $M_3$. Then, the specifying unit 11 extracts "Oil", which is the word that is contained in common in the acquired phrases "Jojoba oil" and "Squalane oil", being qualified by "Jojoba" and "Squalane". The specifying unit 11 then specifies the extracted word "Oil" as the reference word.

The extraction unit 12 is a part that extracts the word that is contained in a phrase contained in product information (item information) which belong to any one of a plurality of categories, qualifying or being qualified by the reference word, as the candidate category name. The extraction of the candidate category name is specifically described with reference to FIG. 5. The extraction unit 12 extracts "Facial cleansing" and "Argan", which are not set as the name of a category, among the words "Jojoba", "Facial cleansing", "Squalane" and "Argan" that qualify the reference word "Oil" in the product information $M_1$, $M_2$ and $M_3$ as the candidate category name. Note that, although the extraction unit 12 extracts the candidate category name by referring to the product information stored in the product information storage unit 21 which the specifying unit 11 has referred to for specifying the reference word in this embodiment, the extraction unit 12 may extract the candidate category name by referring to a set of product information that is different from the set of product information which the specifying unit 11 has referred to.

The extraction unit 12 may exclude the word that is contained in the plurality of product information $M_1$, $M_2$ and $M_3$ together with the reference word at a specified frequency or more from the candidate category name. To be specific, when the specified frequency is 2, for example, the extraction unit 12 excludes the word "Facial cleansing" from the candidate category name because the word "Facial cleansing" is extracted twice in the product information $M_1$, $M_2$ and $M_3$. In other words, the extraction unit 12 extracts the word "Argan" as the candidate category name based on the example of the product information shown in FIG. 5. It is thereby possible to prevent a word that is not appropriate for a category name from being output as the candidate category name.

The output unit 13 is a part that outputs the candidate category name extracted by the extraction unit 12. To be specific, the output unit 13 outputs "Argan", which is the word being the candidate category name. Examples of the output include display output for presentation to an administrator of an electronic commerce site, output to a specified storage means and the like. Further, the output unit 13 may output the candidate category name to the setting unit 14 for setting as a category.

Figure 6:
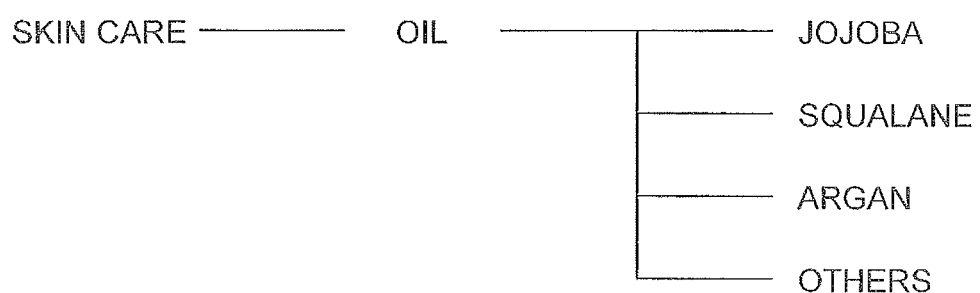
FIG. 6 is a view schematically showing category information stored in the product category information storage unit after change of the category information in FIG. 4(a).

The setting unit 14 is a part that sets the candidate category name that is output by the output unit 13 as a category. The setting of a category is specifically described with reference to FIG. 4(a) and FIG. 6. FIG. 6 is a view schematically showing the category information stored in the product category information storage unit 22 after change of the category information in FIG. 4(a). As shown in FIG. 6, the setting unit 14 sets the new category "Argan" which is in parallel structure with "Jojoba" and "Squalane". Note that the setting unit 14 is not an essential element of the present invention.

Figure 8:
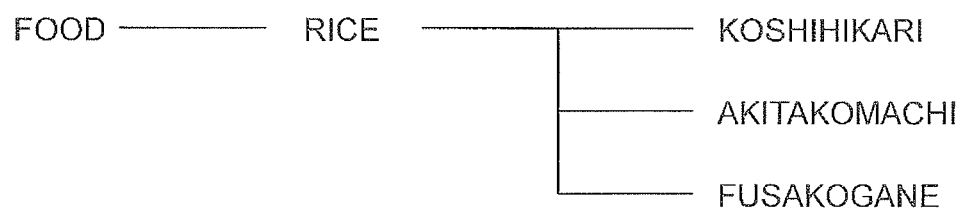
FIG. 8 is a view schematically showing category information stored in the product category information storage unit after change of the category information in FIG. 4(b).

Other examples of the reference word specifying process, the candidate category name extraction process, and the category setting process are specifically described hereinafter with reference to FIGS. 7 and 8. FIG. 7 is a view schematically showing an example of product information. FIG. 8 is a view schematically showing category information stored in the product category information storage unit 22 after change of the category information in FIG. 4(b). Each of the product information shown in FIG. 7 belongs to any one of the categories shown in FIG. 4(b). The product information $M_4$ shown in FIG. 7(a) belongs to the category "Koshihikari" and contains the phrase "Koshihikari Made in Niigata". The product information $M_5$ shown in FIG. 7(b) belongs to the category "Akitakomachi" and contains the phrase "Akitakomachi Made in Akita". The product information $M_6$ shown in FIG. 7(c) belongs to the category "Chiba No. 28" and contains the phrase "Fusakogane Made in Chiba". The product information $M_7$ shown in FIG. 7(d) belongs to the category "Chiba No. 28" and contains the phrase "Fusakogane (former name: Chiba No. 28)".

The specifying unit 11 acquires the phrase "Koshihikari Made in Niigata" that contains the category name "Koshihikari" from the product information $M_4$ that belongs to the category "Koshihikari", and acquires the phrase "Akitakomachi Made in Akita" that contains the category name "Akitakomachi" from the product information $M_5$ that belongs to the category "Akitakomachi". In other words, the specifying unit 11 acquires "Koshihikari Made in Niigata" and "Akitakomachi Made in Akita" as the phrases that are contained in a plurality of product information which respectively belong to a plurality of categories and that contain the category name to which the product information belongs. Note that, because the phrase that contains the category name "Chiba No. 28" is not contained in the product information $M_6$, the specifying unit 11 does not acquire the phrase for specifying the reference word from the product information $M_6$. Further, the specifying unit 11 may acquire the phrase "Fusakogane (Former name: Chiba No. 28)" that contains the category name "Chiba No. 28". Then, the specifying unit 11 extracts "Made in (Place)", which is the word that qualifies the word being the category name in the acquired phrases "Koshihikari Made in Niigata", "Akitakomachi Made in Akita" and "Fusakogane (Former name: Chiba No. 28)". Because the word "Made in (Place)" is contained in common in the product information of a plurality of categories, the specifying unit 11 specifies the extracted word "Made in (Place)" as the reference word.

The extraction unit 12 extracts "Fusakogane", which is not the word already set as the category name, among "Koshihikari", "Akitakomachi" and "Fusakogane" that are qualified by the reference word "Made in (Place)" in the product information $M_4$, $M_5$ and $M_6$ as the candidate category name.

The output unit 13 outputs "Fusakogane", which is the word being the candidate category name. The output unit 13 outputs the candidate category name to the setting unit 14 for setting as a category.

When the product information that belong to a plurality of categories contains a specified description indicating the relationship between the category name of one of the plurality of categories and the candidate category name, the setting unit 14 may set the candidate category name as a category in place of the one category. To be specific, in the case where the format such as "(Existing category name) (Former name: (Candidate category name)" is preset as a specified description in order to set a word being the candidate category name as a new category in place of the existing category, when the description such as "Fusakogane (Former name: Chiba No. 28)" is extracted from the product information $M_7$, the setting unit 14 sets the candidate category name "Fusakogane" as a new category in place of the category name "Chiba No. 28" (see FIG. 4(b)) as shown in FIG. 8. An appropriate word as a category name is thereby set as a new category in place of the existing category.

Variations of the setting process that sets the candidate category name as a category by the setting unit 14 are described hereinafter.

When the magnitude relationship between the number of searches for each category name of a plurality of categories and the number of searches for a word being the candidate category name in the product information that belong to the plurality of categories to which the product information referred to in the extraction of a reference word belong satisfies a specified condition, the setting unit 14 may set the candidate category name as a category in parallel structure with the plurality of categories. To be specific, in the product information under "Oil" in the category structure of FIG. 4(a), for example, when the number of searches with a word such as "Argan" being the candidate category name is larger than the smallest one of the numbers of searches with words such as "Jojoba" and "Squalane", the setting unit 14 determines that a specified condition is met and sets "Argan" as the category under "Oil". It is thereby possible to set a category with an appropriate word as a new category name. The number of searches when each category name and a word being the candidate category name are searched for in the product information can be acquired by the setting unit 14 by referring to or searching the product information storage unit 21 based on each word.

When the magnitude relationship between the number of times a product is purchased based on search with a word being the candidate category name and the number of times a product is purchased based on search with each category name of a plurality of categories in the product information that belong to the plurality of categories to which the product information referred to in the extraction of a reference word belong satisfies a specified condition, the setting unit 14 may set the candidate category name as a category in parallel structure with the plurality of categories. To be specific, on an electronic commerce site to which the category name extraction device 1 belongs, when the number of times a product is purchased based on a result of search with a word such as "Argan" being the candidate category name is larger than the smallest one of the numbers of times a product is purchased based on a result of searches with words such as "Jojoba" and "Squalane" indicating the categories under "Oil" in the category structure of FIG. 4(a), for example, the setting unit 14 determines that a specified condition is met and sets "Argan" as the category under "Oil". It is thereby possible to set a category with an appropriate word as a new category name. The number of times a product is purchased based on a search result with a specific word can be obtained by referring to a database that stores access logs, product purchase histories and the like on the electronic commerce site to which the category name extraction device 1 belongs.

When a set of search results with a word being the candidate category name contains a set of search results with a word being the category name of one of the plurality of categories to a certain degree or higher in the product information that belongs to a plurality of categories to which the product information referred to in the extraction of a reference word belong, the setting unit 14 may set the candidate category name as a category in place of the one category. To be specific, in the case where the candidate category name "Fusakogane" is output by the output unit 13 in the category structure of FIG. 4(b), for example, the setting unit 14 sets "Fusakogane" as the category under "Rice" in place of "Chiba No. 28" when a set of search results with the word "Chiba No. 28" is contained by 80% or more in a set of search results with the word "Fusakogane" in the product information under "Rice". The category structure suitable for product search is thereby implemented.

When a set of stores selling products that belong to a plurality of categories to which the product information referred to in the extraction of a reference word belong and a set of stores selling products containing a word being the candidate category name in the product information coincide to a certain degree or higher, the setting unit 14 may set the candidate category name as a category. To be specific, on an electronic commerce site to which the category name extraction device 1 belongs, when a list of stores selling products that belong to the categories "Koshihikari" and "Akitakomachi" set under "Rice" and a list of stores selling products containing the candidate category name "Fusakogane" in the product information coincide to a certain degree (for example, by 80%) or higher in the category structure of FIG. 4(b), for example, the setting unit 14 sets "Fusakogane" as the category under "Rice". It is thereby possible to set a category with an appropriate word as a new category name. The list of stores selling a specific product can be obtained by referring to a database (for example, the product information storage unit 21) that stores product information on sale by each store on the electronic commerce site to which the category name extraction device 1 belongs, for example.

When a set of products on sale by stores selling products that belong to a plurality of categories to which the product information referred to in the extraction of a reference word belong and a set of products on sale by stores selling products containing a word being the candidate category name in the product information coincide to a certain degree or higher, the setting unit 14 may set the candidate category name as a category. To be specific, on an electronic commerce site to which the category name extraction device 1 belongs, when a set of products on sale by stores selling products that belong to the categories "Koshihikari" and "Akitakomachi" set under "Rice" and a set of products on sale by stores selling products containing the candidate category name "Fusakogane" in the product information have similarity of a certain degree or higher in the category structure of FIG. 4(b), for example, the setting unit 14 sets "Fusakogane" as the category under "Rice". It is thereby possible to set a category with an appropriate word as a new category name. The list of products on sale by stores selling a specific product can be obtained by referring to a database (for example, the product information storage unit 21) that stores product information on sale by each store on the electronic commerce site to which the category name extraction device 1 belongs, for example.

When the price range of products that belong to a plurality of categories to which the product information referred to in the extraction of a reference word belong and the price range of products containing a word being the candidate category name in the product information coincide to a certain degree or higher, the setting unit 14 may set the candidate category name as a category. To be specific, on an electronic commerce site to which the category name extraction device 1 belongs, when the price range of products that belong to the categories "Koshihikari" and "Akitakomachi" set under "Rice" and the price range of products containing the candidate category name "Fusakogane" in the product information coincide to a certain degree or higher in the category structure of FIG. 4(b), for example, the setting unit 14 sets "Fusakogane" as the category under "Rice". The price range of a specific product can be obtained by referring to a database (for example, the product information storage unit 21) that stores product information on sale by each store on the electronic commerce site to which the category name extraction device 1 belongs, for example. The degree of coincidence of the price range can be calculated by a known analysis technique.

When the distribution of the price of products containing a word being the candidate category name in the product information is equal to or less than a specified value, the setting unit 14 may set the candidate category name as a category. To be specific, on an electronic commerce site to which the category name extraction device 1 belongs, for example, when the distribution of the price of products containing the candidate category name "Fusakogane" in the product information is equal to or less than a specified value, the setting unit 14 sets "Fusakogane" as the category under "Rice". The distribution of the price of a specific product can be calculated by a known analysis technique by referring to a database (for example, the product information storage unit 21) that stores product information on sale by each store on the electronic commerce site to which the category name extraction device 1 belongs.

Referring back to FIG. 2, the registration unit 15 is a part that, when the candidate category name is to be set as a new category by the setting unit 14, transmits inquiry information to the store terminal D of the store selling products containing a word being the candidate category name in the product information to prompt a change of the category to which the products belong to the category to be set, and changes the category of the products according to a response from the store terminal D to the transmission of the inquiry information.

To be specific, when the candidate category name "Argan" is to be set as a new category by the setting unit 14, the registration unit 15 extracts the product information containing "Argan" from the product information storage unit 21. Then, the registration unit 15 transmits inquiry information to the store terminal D of the store selling products of the extracted product information to prompt a change of the category to which the products belong to the category to be newly set. FIG. 9 is a view showing an example of a display screen of inquiry information. As shown in FIG. 9, the inquiry information contains a list of products whose product information contain "Argan", a message prompting a change of a category, an operation part for receiving a change of a category and the like. When a user of the store terminal D checks the check box of the product to change its category and presses the button "Modify Registration" in the display screen example shown in FIG. 9, a response indicating the change of the category of the product checked is sent from the store terminal D to the registration unit 15. Then, the registration unit 15 changes the category of the product with the checked box in the response from the store terminal D. The change of a category is done by rewriting the attribute of the product information of the relevant product stored in the product information storage unit 21. It is thereby possible to appropriately classify the products on sale by each store again into the category newly set.

Figure 10:
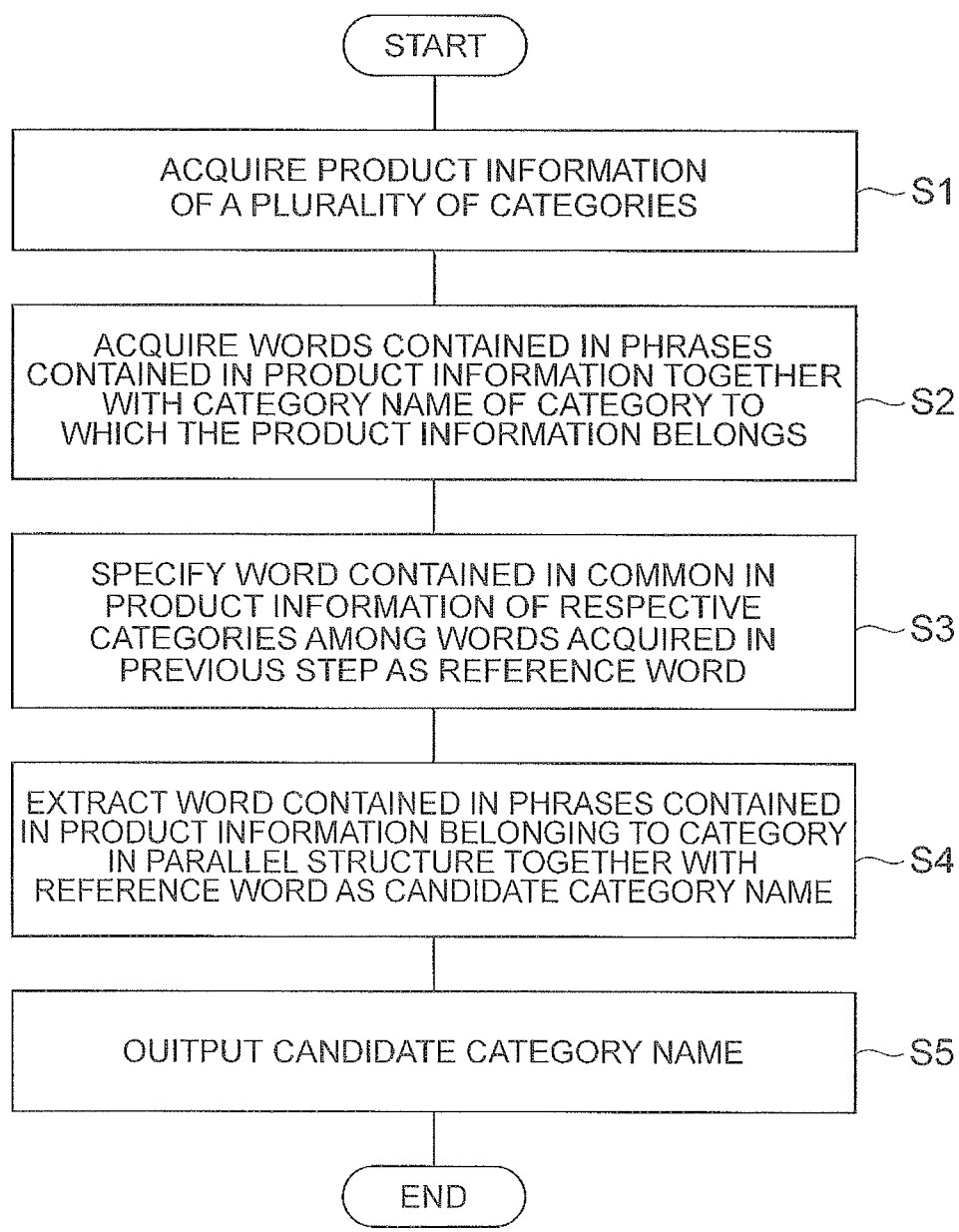
FIG. 10 is a flowchart showing an example of a process of a category name extraction method.

A category name extraction method according to this embodiment is described hereinafter with reference to FIG. 10. FIG. 10 is a flowchart showing an example of a process of the category name extraction method in the category name extraction device 1 shown in FIG. 2.

First, the specifying unit 11 acquires a plurality of product information that respectively belong to a plurality of categories in parallel structure (S1). Next, the specifying unit 11 acquires a word that is contained in the phrases contained in the acquired product information, qualifying or being qualified by the category name of the category to which the product information belongs (S2).

Then, the specifying unit 11 specifies the word that is acquired in Step S2 and contained in common in the product information that respectively belong to a plurality of categories as the reference word (S3).

After that, the extraction unit 12 extracts a word that is contained in the phrase contained in the product information that belong to any of the plurality of categories, qualifying or being qualified by reference word, and that is not set as a category name as the candidate category name (S4). Then, the output unit 13 outputs the candidate category name extracted by the extraction unit 12 (S5).

Figure 11:
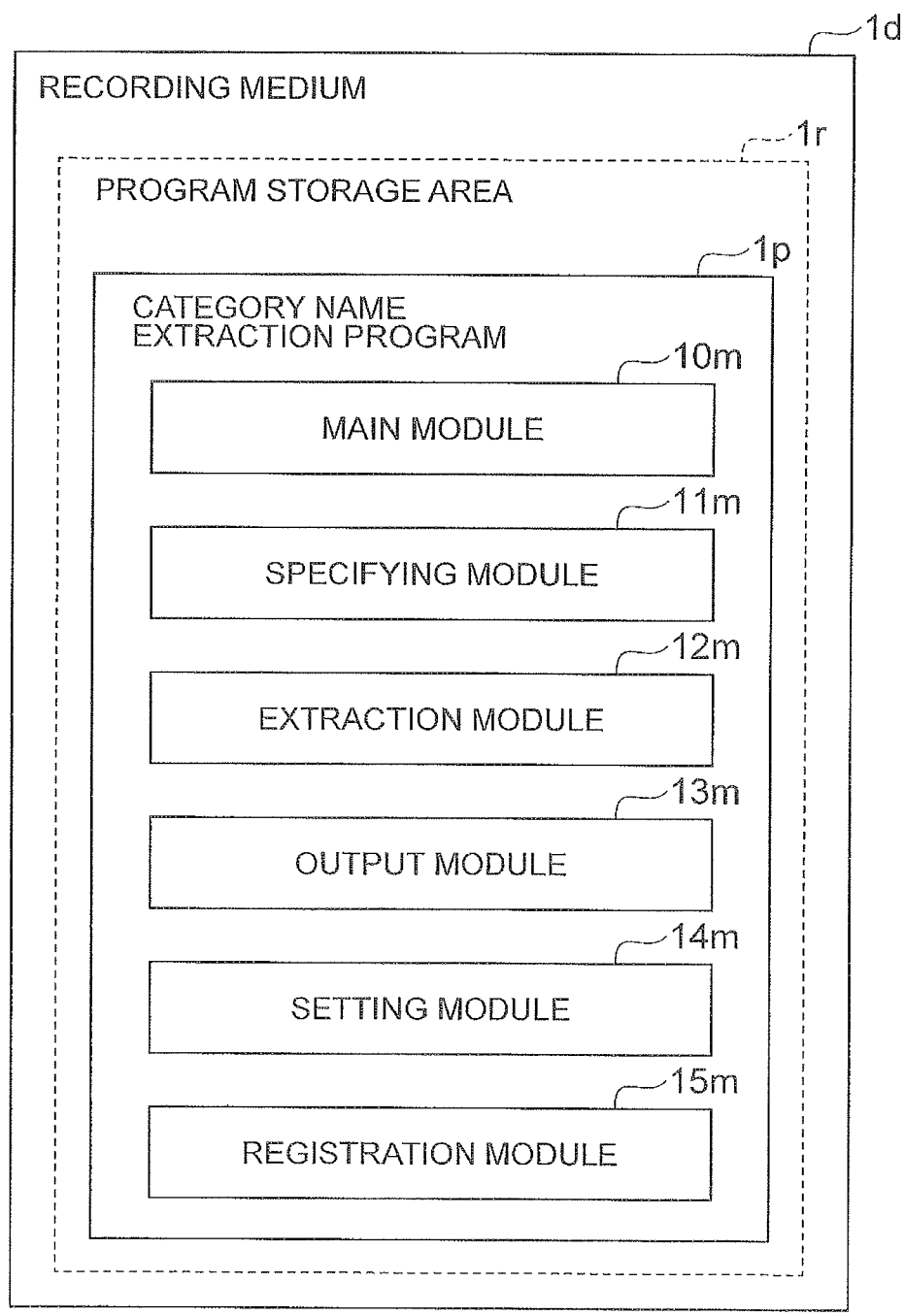
FIG. 11 is a view showing a configuration of a category name extraction program.

Hereinafter, a category name extraction program that causes a computer to function as the category name extraction device 1 is described with reference to FIG. 11. A category name extraction program 1p includes a main module 10m, a specifying module 11m, an extraction module 12m, an output module 13m, a setting module 14m, and a registration module 15m.

The main module 10m is a part that exercises control over the category name extraction processing. The functions implemented by executing the specifying module 11m, the extraction module 12m, the output module 13m, the setting module 14m and the registration module 15m are respectively equal to the functions of the specifying unit 11, the extraction unit 12, the output unit 13, the setting unit 14 and the registration unit 15 of the category name extraction device 1 shown in FIG. 2.

The category name extraction program 1p is provided through a recording medium 1d such as CD-ROM or DVD-ROM or semiconductor memory, for example. Further, the category name extraction program 1p may be provided as a computer data signal superimposed onto a carrier wave over a communication network.

According to the category name extraction device 1, the category name extraction method and the category name extraction program 1p of the embodiment described above, a word that is contained in the phrases contained in the product information that respectively belong to a plurality of categories, qualifying or being qualified by the category name to which the product information belongs, and contained in common in the product information of a plurality of different categories is specified as the reference word. Then, a word that is contained in the product information that belong to a plurality of categories, qualifying or being qualified by the reference word, is extracted and output as the candidate category name. The word that represents the features of the products which belong to the same level as the plurality of categories and that is appropriate for classifying the products is thereby output, and it is thus possible to reduce the time and effort required for maintenance such as category name setting.

An embodiment of the present invention is described in detail above. However, the present invention is not limited to the above-described embodiment. Various changes and modifications may be made to the present invention without departing from the scope of the invention.

REFERENCE SIGNS LIST

1 . . . category name extraction device, 11 . . . specifying unit, 12 . . . extraction unit, 13 . . . output unit, 14 . . . setting unit, 15 . . . registration unit, 21 . . . product information storage unit, 22 . . . product category information storage unit, 100 . . . category name extraction system, 10m . . . main module, 11m . . . specifying module, 12m . . . extraction module, 13m . . . output module, 14m . . . setting module, 15m . . . registration module, 1d . . . storage medium, 1p . . . category name extraction program, D . . . store terminal, $M_1, M_2, M_3, M_4, M_5, M_6, M_7$ . . . product information

The invention claimed is:

1. A category name extraction device comprising:
   at least one memory operable to store computer program code; and
   at least one processor configured to access said memory, read said program code, and operate according to said program code, said program code including:
   specifying code configured to cause at least one of said at least one processor to specify a word contained in a plurality of item information respectively belonging to a plurality of categories in a parallel structure, the word directly qualifying or being directly qualified by a name of a category where each item information belongs, and being in common to a plurality of item information belonging to a plurality of different categories, as a reference word,
   extraction code configured to cause at least one of said at least one processor to:
   i) extract a first word from a first entry of a first category of the plurality of categories as a candidate category name, wherein the first word directly qualifies or is directly qualified by the reference word in the first entry of the first category, wherein the first word of the first entry is not already a name of any of the plurality of categories, and wherein first item information of the first category includes the first entry, and
   ii) identify the first word as a first candidate category name,
   setting code configured to cause at least one of said at least one processor to set the first candidate category name as a first new category in parallel structure with the plurality of categories,
   registration code configured to cause at least one of said at least one processor to, when the first candidate category name is set as the first new category,
   A) transmit inquiry information to a user terminal that registers second item information containing the first word to change a category where the second item information belongs to the first new category, and
   B) change a category of the second item information, based on a response from the user terminal to a transmission of the inquiry information, to the first new category associated with the first candidate category name, and
   update code configured to update a product category information database based on the first new category associated with the first candidate category name; and
   an output device configured to output the first candidate category name.

2. The category name extraction device according to claim 1, wherein
   the extraction code is further configured to cause at least one of said at least one processor to exclude a word contained in item information belonging to the plurality of categories, directly qualifying or being directly qualified by the reference word, and contained in a plurality of item information belonging to the plurality of categories at a specified frequency of two or more from the first candidate category name.

3. The category name extraction device according to claim 1, wherein
when a magnitude relationship between a number of searches for each category name of the plurality of categories and the number of searches for a word being the candidate category name in the item information belonging to the plurality of categories satisfies a specified condition, the setting code is further configured to cause at least one of said at least one processor to set the first candidate category name as a category in parallel structure with the plurality of categories.

4. The category name extraction device according to claim 1, wherein
when a set of search results with a word being the candidate category name contains a set of search results with a word being a category name of one category among the plurality of categories to a certain degree or higher in the item information belonging to the plurality of categories, the setting code is further configured to cause at least one of said at least one processor to set the first candidate category name as a category in place of the one category.

5. The category name extraction device according to claim 1, wherein
when the item information belonging to the plurality of categories contain a specified description indicating a relationship between a category name of one category among the plurality of categories and the candidate category name, the setting code is further configured to cause at least one of said at least one processor to set the first candidate category name as a category in place of the one category.

6. The category name extraction device according to claim 1, wherein
the plurality of categories are categories for classifying at least one of products and services offered by stores on an electronic commerce site,
the first item information is product information being information about a product or a service, and
when a magnitude relationship between a number of times a product or a service is purchased based on search with a word being the candidate category name and the number of times a product or a service is purchased based on search with each category name of the plurality of categories in the product information belonging to the plurality of categories satisfies a specified condition, the setting code is further configured to cause at least one of said at least one processor to set the first candidate category name as a category in parallel structure with the plurality of categories.

7. The category name extraction device according to claim 1, wherein
the plurality of categories are categories for classifying at least one of products and services offered by stores on an electronic commerce site,
the first item information is product information being information about a product or a service, and
when a set of stores selling products or services belonging to the plurality of categories and a set of stores selling products or services containing the first word in the product information coincide to a certain degree or higher, the setting code is further configured to cause at least one of said at least one processor to set the candidate category name as a category.

8. The category name extraction device according to claim 1, wherein
the plurality of categories are categories for classifying at least one of products and services offered by stores on an electronic commerce site,
the first item information is product information being information about a product or a service, and
when a set of products or services on sale by stores selling products or services belonging to the plurality of categories and a set of products or services on sale by stores selling products or services containing the first word in the product information coincide to a certain degree or higher, the setting code is further configured to cause at least one of said at least one processor to set the candidate category name as a category.

9. The category name extraction device according to claim 1, wherein
the plurality of categories are categories for classifying at least one of products and services offered by stores on an electronic commerce site,
the first item information is product information being information about a product or a service, and
when a price range of products or services belonging to the plurality of categories and a price range of products or services containing the first word in the product information coincide to a certain degree or higher, the setting code is further configured to cause at least one of said at least one processor to set the candidate category name as a category.

10. The category name extraction device according to claim 1, wherein
the plurality of categories are categories for classifying at least one of products and services offered by stores on an electronic commerce site,
the first item information is product information being information about a product or a service, and
when distribution of prices of products or services containing the first word in the product information is equal to or less than a specified value, the setting code is further configured to cause at least one of said at least one processor to set the candidate category name as a category.

11. The category name extraction device according to claim 1, wherein
the plurality of categories are categories for classifying at least one of products and services offered by stores on an electronic commerce site,
the first item information is product information being information about a product or a service.

12. The information processing device of claim 1, wherein the first category of the plurality of categories has a hierarchical structure having a first level and a second level, wherein the second level is characterized by the parallel structure.

13. A category name extraction method in a category name extraction device, executed by at least one processor in said category name extraction device, the category name extraction method comprising:
specifying a word contained in a plurality of item information respectively belonging to a plurality of categories in a parallel structure, the word directly qualifying or being directly qualified by a name of a category where each item information belongs, and being in common to a plurality of item information belonging to a plurality of different categories, as a reference word;
extracting a first word from a first entry of a first category of the plurality of categories as a candidate category name, wherein the first word directly qualifies or is directly qualified by the reference word in the first entry of the first category, wherein the first word of the first entry is not already a name of any of the plurality of categories, and wherein first item information of the first category includes the first entry;

identifying the first word as a first candidate category name;

setting the first candidate category name as a first new category in parallel structure with the plurality of categories;

when the first candidate category name is set as the first new category, transmitting inquiry information to a user terminal that registers second item information containing the first word to change a category where the second item information belongs to the first new category;

changing a category of the second item information, based on a response from the user terminal to a transmission of the inquiry information, to the first new category associated with the first candidate category name;

outputting the first candidate category name; and updating a product category information database based on the first new category associated with the first candidate category name.

14. The category name extraction method of claim 13, wherein the first category of the plurality of categories has a hierarchical structure having a first level and a second level, wherein the second level is characterized by the parallel structure.

* * * * *